US007365544B2

(12) United States Patent
McCracken et al.

(10) Patent No.: US 7,365,544 B2
(45) Date of Patent: Apr. 29, 2008

(54) METHODS OF ADJUSTING AIRBORNE GEOPHYSICAL MEASUREMENTS BASED ON MAPPING INSTRUMENT MEASUREMENTS

(75) Inventors: Ken G. McCracken, Via Mittagong (AU); James Beresford Lee, New Lambton Heights (AU)

(73) Assignee: BHP Billiton Innovation Pty Ltd., Melbourne, Victoria (AU)

( * ) Notice: Subject to any disclaimer, the term of this patent is extended or adjusted under 35 U.S.C. 154(b) by 421 days.

(21) Appl. No.: 10/492,391

(22) PCT Filed: Oct. 11, 2002

(86) PCT No.: PCT/AU02/01378

§ 371 (c)(1),
(2), (4) Date: Sep. 17, 2004

(87) PCT Pub. No.: WO03/032015

PCT Pub. Date: Apr. 17, 2003

(65) Prior Publication Data

US 2005/0017721 A1    Jan. 27, 2005

(30) Foreign Application Priority Data

Oct. 11, 2001   (AU) ..................... PR8202
Jul. 24, 2002   (AU) ............... 2002950333

(51) Int. Cl.
*G01V 3/08* (2006.01)
*G01V 5/02* (2006.01)
*G01V 7/00* (2006.01)
*G12B 13/00* (2006.01)

(52) U.S. Cl. ................... 324/330; 324/331; 702/2; 702/5; 250/253; 703/5; 73/1.78; 73/382 G; 33/328

(58) Field of Classification Search ........... 324/330, 324/331; 702/2, 5; 250/253; 703/5; 382/103, 382/206; 73/1.78, 382 G
See application file for complete search history.

(56) References Cited

U.S. PATENT DOCUMENTS 4,435,981 A    3/1984   Carson et al.

(Continued)

FOREIGN PATENT DOCUMENTS

WO   WO 95/05615   2/1995
WO   WO 02/103398  12/2002

OTHER PUBLICATIONS

Glagolev, V.A., Abstract RU 2038618-C1, S02 S03, 96-115020/12, Jun. 27, 1995.
Asai Il Koyo, Abstract JP 11023263-A, SO2, 99-170004/15, Jan. 29, 1999.

*Primary Examiner*—Reena Aurora
*Assistant Examiner*—David M. Schindler
(74) *Attorney, Agent, or Firm*—DLA Piper US LLP

(57) ABSTRACT

This invention concerns a method of making airborne geophysical measurements. Such measurements may be made from fixed or moving wing airplanes or dirigibles. The method comprises the following steps: taking first real time measurements from one, or more, geophysical instruments mounted in an aircraft to produce geophysical data related to the ground below that instrument. Taking second real time measurements from navigation and mapping instruments associated with or carried by the aircraft. Computing a background response of each geophysical instrument using the second real time measurements to take account of its time varying altitude, and the time varying topography of the ground below it. Adjusting an operating or data processing condition of each geophysical instrument using the respective background response and the instrument's attitude to enhance the performance of that instrument. And, adjusting the geophysical data output for that instrument having reduced effects resulting from variations in altitude, attitude and topography.

31 Claims, 2 Drawing Sheets

U.S. PATENT DOCUMENTS

| | | | |
|---|---|---|---|
| 4,641,100 A * | 2/1987 | Dzwinel | 324/330 |
| 5,214,281 A * | 5/1993 | Rowe | 250/253 |
| 5,402,340 A | 3/1995 | White et al. | |
| 5,557,397 A | 9/1996 | Hyde et al. | |
| 5,894,323 A * | 4/1999 | Kain et al. | 348/116 |
| 5,924,056 A | 7/1999 | Boedecker et al. | |

* cited by examiner

METHODS OF ADJUSTING AIRBORNE GEOPHYSICAL MEASUREMENTS BASED ON MAPPING INSTRUMENT MEASUREMENTS

CROSS REFERENCE TO RELATED APPLICATIONS

This application claims the benefit of priority under 35 USC § 119(a)-(d) of International Application No. PCT/AU02/01378, with an international filing date of Oct. 11, 2002, which claims priority to Australian Application No. PR 8202, filed Oct. 11, 2001, and Australian Application No. 2002950333 filed Jul. 24, 2002, which is incorporated herein by reference in its entirety.

TECHNICAL FIELD

This invention concerns a method of making airborne geophysical measurements. Such measurements may be made from fixed or moving wing airplanes or dirigibles.

BACKGROUND ART

Airborne geophysical measurements have been made using aircraft equipped with a geophysical instrument. At different times, different geophysical instruments have been used, such as:

A magnetometer has been used to measure the distortions and additions to the magnetic field of the earth due to the rocks and minerals below the aircraft.

An electromagnetic (EM) sounding system has been used to measure the effects of the electrical conductivities of the rocks and minerals below the aircraft.

A radiometric survey system has been used to measure the radioactive emanations from the radioactive isotopes of the elements that are the constituent components of the rocks and earth below the aircraft.

A gravimeter sensor, and more recently a gravity gradiometer has been used to measure the gravitational field, from which the density of the rocks and minerals below the aircraft can be inferred.

A hyperspectral scanner has been used to measure the reflectance spectra of the rocks, earth and vegetation below the aircraft.

The interpretation of geophysical data collected from airborne measurements using such pieces of equipment takes place on the ground in a geological office. The purpose of the interpretation is to establish priorities for subsequent investigation on the ground. Frequently, data is combined from several types of measurements obtained from different specialist geophysical aircraft, and at different times, to assist in the interpretation.

SUMMARY OF THE INVENTION

In a first aspect, the invention is a method of making airborne geophysical measurements, comprising the following steps:

Taking first measurements as a function of time from one, or more, geophysical instruments associated with or carried by at least one aircraft to produce geophysical data related to the ground below that instrument.

Taking second measurements as a function of time from navigation and mapping instruments associated with or carried by the at least one aircraft.

Computing a background response of each geophysical instrument as a function of time using the second measurements to take account of its time varying altitude, and the time varying topography of the ground below that instrument.

Adjusting data processing conditions applied to the geophysical data from each geophysical instrument using the respective background response and the instruments attitude to enhance the performance of that instrument. And, Adjusting the geophysical data using the respective background response to yield a geophysical data output for that instrument having reduced effects resulting from variations in altitude, attitude and topography.

The first and second measurements may be taken in real time.

The first and second measurements may be recorded on a recording medium to allow future retrieval of the measurements.

The step of computing a background response may take place, in real time, within the aircraft during flight or after the flight is completed.

Using the resulting geophysical data output, or several outputs from different geophysical instruments, it may be possible to identify exploration targets, and to compute their size and other key parameters, such as density, electrical conductivity and magnetic properties.

The second measurements may be used to compute:

The trajectory of the aircraft and the individual geophysical instruments in three dimensional space as a function of time.

The attitude (pitch, roll and yaw) of the individual geophysical instruments as a function of time. And, A three-dimensional mathematical model of the ground below the aircraft as a function of time, and may be created instantaneously.

And the background response may be computed from these measurements when the data is analysed, and may be performed in real time.

Time varying adjustment and/or data processing conditions may be calculated for each geophysical instrument from the background response and each instrument's attitude.

The geophysical instruments include one or more of a one or more magnetic surveying instruments, an electromagnetic (EM) sounding system, a radiometric survey system, a gravimeter sensor, a gravity gradiometer, and a hyperspectral scanner.

A scalar magnetometer is used to measure the magnitude of the is magnetic vector, a vector magnetometer to measure three orthogonal component of the magnetic vector. A magnetic gradiometer is used to measure the six independent terms of the magnetic tensor.

The electromagnetic sounding system is used to measure the effects of the electrical conductivities of the rocks and minerals below the aircraft.

A radiometric survey system is used to measure the radioactive emanations from the radioactive isotopes of the elements that are the constituent components of the rocks and earth below the aircraft The gravity gradiometer system is used to measure the gradient of the earth's gravitational field, and may also yield the attitude of the aircraft in three dimensional space, and the vertical velocity and acceleration of the aircraft. A gravimeter is used to measure the magnitude of the earth's gravity.

A hyperspectral scanner is used to measure the reflectance of the earth, rocks and vegetation below the aircraft; and a radar altimeter to determine the altitude.

More than one geophysical instrument may be used, and they may be mounted in the same or different aircraft, which may be the same or a different aircraft from the one in which the navigation and mapping instruments are mounted.

In this case where geophysical data has been acquired by more than one geophysical instrument mounted in the same aircraft, the method may be enhanced by using the measurements taken from each instrument to identify and remove correlated errors in the measurements. Such errors may include residual height, topography, and attitude errors in magnetic, gravity, radiometrics, hyperspectral and electromagnetic instruments.

The navigation and mapping instruments may include an inertial navigation system, a GPS or DGPS and a topographic measuring system, such as a scanner. An optical (laser) scanning system or microwave scanning system may be used, for example, a Synthetic Aperture Radar (SAR). A radar or other altimeter may also be used.

The inertial navigation system may be used to determine the scanning system's position and orientation.

The GPS may be used to determine the position of the scanning system.

A scanning system may be used to emit pulses which reflect off the terrain below the aircraft. The scanning system may be able to measure the topography of the terrain to an accuracy of 1 meter over a distance of 1 to 2 times the aircraft's height on either side of the track of the airborne platform.

Other ancillary equipment may also be included, such as a data logging system.

The geophysical sensor may be mounted in the same aircraft as the navigation and mapping instruments. Alternatively, the geophysical sensors may be mounted in separate but related aircraft, such as a bird which is towed from behind the aircraft in which the navigation and mapping instruments are mounted.

The GPS and data from the inertial navigation system may be processed together to derive the best detailed trajectory of the aircraft and the individual geophysical instruments as a function of time, and possibly in real time. This trajectory may be integrated with the scanning ranges to provide the three-dimensional mathematical model of the terrain surveyed by the aircraft at each instant of time.

The mathematical model may be made up of a 3-dimensional array of volume elements. The array may extend above and below the ground, and over a distance of up to twice the aircraft's height on either side of the point immediately below the aircraft at a particular time. Each volume element makes at least an inverse square contribution to each instruments reading.

The three-dimensional mathematical model may be used to compute the magnetic, electrical, radiometric, gravity and hyperspectral background responses of each geophysical sensor due to the variations in the trajectory, and the topography, and may be computed in real time.

The computed background response and attitude for each instrument are used to make continuous time varying adjustments to the data processing conditions being applied to the data from the instrument and to eliminate the background response from the data outputs. The computed background response may be instantaneous.

Adjustments to the data processing conditions may include using the background response as a differential reference signal for the instrument itself, in order to significantly reduce the dynamic range. Alternatively, filter characteristics, or other processing parameters may be adjusted to obtain an optimum signal to noise ratio in the processed data.

Using the invention, it may be possible to map the geophysical properties of the area being surveyed with greater accuracy. Further it may be possible to estimate the size of exploration targets with greater accuracy, and improve the accuracy of the estimates of their geophysical properties. This could increase the probability of success in subsequent exploration.

Utilisation of several forms of airborne geophysical measurement together may improve the accuracy of each of the several measurement techniques. It may jointly reduce the errors inherent in each type of measurement as a consequence of the properties of the airborne environment It may jointly provide estimates of the several physical properties of the ground surveyed by the aircraft that are diagnostic of the nature and characteristics of the rocks and minerals therein. It may allow the reduction of the survey duration in locations where access or weather factors impose severe operational restrictions. It may simplify analysis of the several geophysical measurements. It may reduce the costs and operational overheads of the geophysical survey.

BRIEF DESCRIPTION OF THE DRAWINGS

An example of the invention will now be described with reference to the accompanying drawing, in which.

BEST MODES FOR CARRYING OUT THE INVENTION

Figure 1:
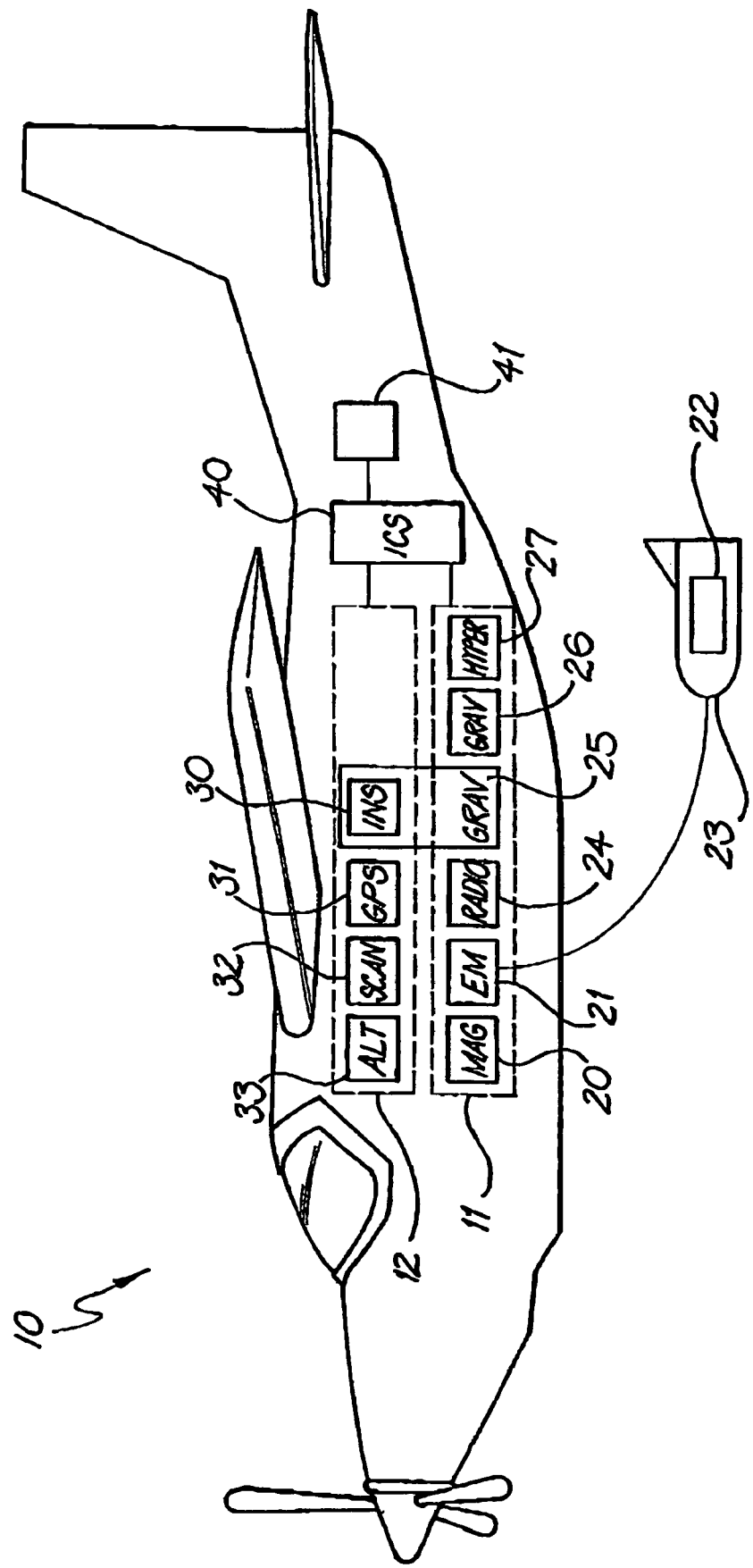
FIG. 1 is a diagram of an aircraft equipped for geophysical surveys.

Referring first to FIG. 1, the aircraft 10 is equipped for making airborne geophysical measurements. The equipment comprises a range of geophysical instruments indicated generally at 11, and a range of navigation and mapping instruments, indicated generally at 12.

Among the geophysical instruments 11 are:

A magnetic sensor or sensors 20 are included to measure the distortions is and additions to the magnetic field of the earth due to the rocks and minerals below the aircraft. The sensors may be one or more of the following (a) a scalar magnetometer that measures the magnitude of the magnetic vector; (b) a vector magnetometer that measures three orthogonal components of the magnetic vector; and (c) a magnetic gradiometer that measures the six independent terms of the magnetic tensor. One or more of these sensors may be mounted in the "bird" 23 being towed behind the aircraft 10.

An electromagnetic (EM) sounding system 21 to measure the effects of the electrical conductivities of the rocks and minerals below the aircraft. The EM system includes a transmitter to send out the electromagnetic signal and a receiver to sense the electromagnetic echo. The receiver 22 may be installed in a "bird" 23 that is towed behind the aircraft 10.

A radiometric survey system 24 is also included to measure the radioactive emanations from the radioactive isotopes of the elements that are the constituent components of the rocks and earth below the aircraft 10.

A gravity gradiometer system 25 is used to measure the gradient of the earth's gravitational field. The gradiometer system 25 may include a high performance inertial navigation unit 30, providing the attitude of the aircraft, and the vertical velocity and acceleration of the airborne platform. A gravimeter 26 may also be provided.

A hyperspectral scanner 27 is also used.

Among the navigation and mapping instruments 12 are:

The high performance inertial navigation unit 30 that may be included within the gradiometer system 25.

A GPS system 31, or differential GPS, mounted in the aircraft to determine the position of the aircraft in space.

The data from all the geophysical and navigational instruments are recorded as a function of time for processing, amalgamation, and interpretation.

A topographical scanning system 32 is mounted in the aircraft. This may comprise an optical scanning system to map the topography of the terrain to a distance of one to two times the aircraft height on either side of the track of the aircraft. Alternatively a microwave scanning system is able to see through vegetation, and thereby map the topography of the ground surface below the vegetative canopy to a distance of one to two times the aircraft height on either side of the track of the aircraft 10.

A radar altimeter 33 is also mounted in the aircraft 10.

Other ancillary equipment may also be included, such as a data logging system 41 and associated memory 42.

A geophysical survey is conducted, using the specialised instruments, by flying over the terrain of interest at a low altitude of 100 m or thereabouts. It is conventional practice to fly in a series of nominally parallel survey lines until the total region to be surveyed has been covered.

The gravity gradiometer system 25 is operable to respond to the variations in density of the rocks and minerals in the vicinity of the point below the aircraft and thereby provides a key diagnostic exploration capability to airborne geophysics.

The magnetic, EM, radiometric and gravitational properties of a volume of rock or minerals are controlled by the values of the magnetic permeability ($\mu$) and remanence, the electrical conductivity ($\sigma$), mass density ($\rho$), and the concentrations of the radioactive material respectively within the volume. For an isolated 3-dimensional rock unit, which is frequently the target in mineral exploration, they also depend upon the horizontal cross section of the target, and its depth and depth extent. Given adequately error free measurements of the magnetic, EM, radiometric and gravity properties of a target of exploration interest good estimates can be made of the volume, depth, and of the physical properties $\mu$, $\sigma$, and $\rho$. These, together with the concentrations of the radioactive elements allow the mineralogical nature of the geophysics target to be estimated.

The inertial navigation unit 30 that is a component of the gravity gradiometer system 25 provides accurate measurements of the vertical velocity and acceleration of the airborne platform ten or more times per second. Using these data together with the GPS 31 and radar altimeter 33 date, the detailed trajectory that was flown by the airborne platform may be determined to within +/−0.5 m. The altitude of the aircraft above the terrain will still vary by greater than +/−20 m due to turbulence, topography, and pilot input.

The scanners 32 measures the topography of the ground between the several flight paths used to map the gravitational characteristics of the ground.

Accurate measurements of the trajectory together with the topography measurements made by the associated optical and optional microwave scanners 32 allows the data from geophysical instruments (magnetics, EM, radiometrics hyperspectral and gravity) to be corrected for height and topography using the algorithm appropriate to each form of measurement.

In addition, the inertial navigation unit 30 that is a component of the gradiometer system 25 measures the attitude of the aircraft with accuracy. As a result the combination of GPS 31, the inertial navigation system 30 and the scanning system 32 provides a superior measurement of the instantaneous height of the aircraft compared to that obtained using a radar altimeter 33. It also provides a high accuracy measurement of the vertical velocity and acceleration of the airborne platform.

The several measurements of magnetism, conductivity, gravity and radiometric properties all vary with airborne platform height according to an inverse square law or stronger to the vicinity of an inverse sixth power. For a flying altitude of 100 m, the residual errors due to altitude alone after correction as outlined above are those due to the +/−0.5 m error in the trajectory and the +/−1 m due to topography. The residual errors in the measurements are therefore 2-6% compared to the geophysical signal from the ground for a noise free trajectory. Since the errors for all four physical measurements vary by inverse power laws or stronger, the relative error between the several measurements is less than about 2%.

The optical and optional microwave scanners 32 associated with the gravity gradiometer system 25 provide measurements of the topography between the flight lines of the survey that are accurate to +/−1 m. These are used to construct a mathematical model of the terrain below the aircraft. Each volume element of this topography relative to the point on the ground that is immediately below the aircraft makes an inverse square, or stronger contribution to each of the magnetic, EM, gravity and radiometric signals at the aircraft 10 or the bird 23. The topographical model of the terrain derived from the scanning systems allows these contributions to be removed from all five forms of geophysical measurement, in real time, after the completion of the flight, or during re-processing at a later time.

The attitude (ie—pitch, roll and yaw) of the airborne platform introduces errors into EM sounding and radiometrics that may be as high as 10% and which are uncorrelated between different surveys. The inertial navigation system 30 that may be a component of the gravity gradiometer system 25 provides an accurate measurement of the attitude of the airborne platform in excess of ten measurements per second, and this permits compensation for these sources of absolute and relative error. These corrections are not made in current practice.

In summary, the multi sensor platform described above and the data processing applied will yield magnetic, EM, gravity, hyperspectral and radiometric data as a function of time with residual errors that are <6% in total, and substantially less relative errors. Such a set of data provides the ability to assess the nature of an exploration target in quantitative detail.

Figure 2:
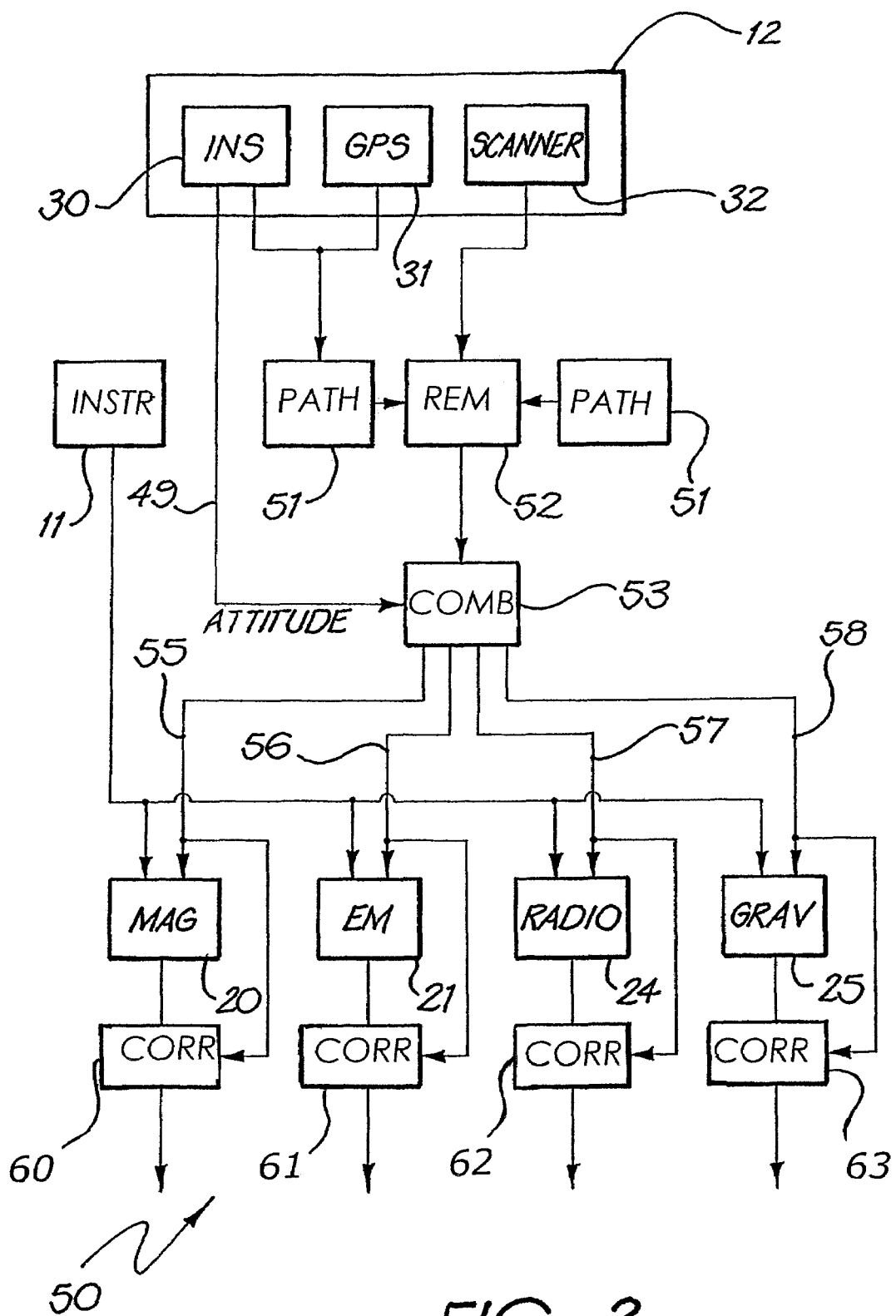
FIG. 2 is a flow diagram of control inputs to geophysical instruments mounted in the aircraft of FIG. 1.

FIG. 2 displays a flow chart 50 describing the steps involved to enhance the instantaneous performance of each instrument. Navigational sensors 12 represent the inertial navigation system 30, GPS 31, and an optical and/or microwave, scanner 32, respectively. The output of sensors 30 and 31 are combined to calculate the trajectory path at 51. The output of scanner 32 is combined with the trajectory path 51 to produce a relative earth model at 52. The background response for each geophysical instrument in the system is generated from the relative earth model 52.

Geophysical instruments 11 include the magnetic sensors 20, a gravity system 25, an EM system 21 and a radiometric system 24. The background response for each geophysical instrument is combined with the respective attitude measurement 49 (from the inertial navigation system 30) at 53 to generate an adjustment parameter 55, 56, 57 and 58 for each instrument. The adjustment parameters are a function of time and each is used to vary the operating controls of respective instruments to enhance the performance of the instrument.

The adjustment parameter 55, 56, 57 and 58 for each instrument are also used to adjust the outputs of each instrument to produce corrected outputs 60, 61, 62 and 63.

For the purposes of illustration, we consider an idealised three dimensional geophysical target of scale size L, of magnetic permeability $\mu$, of electrical conductivity $\sigma$, and mass density $\rho$. We consider a situation where the compensation techniques outlined above have greatly reduced the errors in the geophysical data due to variable altitude, and topography. We indicate these residual second order terms (that is errors of order 1%) by the symbol O(2).

The magnetic anomaly from the target is proportional to $\mu L^3 + O(2)$.

The EM anomaly at "early" times (about 1 millisec) is the so called resistive limit response and varies as $\sigma L^2 + O(2)$. The EM anomaly at "late" times (10-20 millisec) varies as $\sigma L^3 + O(2)$.

The gravity gradient or gravity anomaly varies as $\rho L^3 + O(2)$.

In some cases the radiometric signal varies as the product of $L^2 + O(2)$, and depends as well upon the concentration of the radioactive isotopes near the earth's surface that have been produced by the weathering of the target mineralisation or host material.

Note in particular that the error terms are small compared to the signal from the target itself as a result of the accurate correction for height and topography as detailed above.

Thus there are four or more simultaneous equations involving the four dominant unknowns L, $\mu$, $\sigma$, and $\rho$. As a consequence the equations can be solved for the four variables L, $\mu$, $\sigma$, and $\rho$. The errors due to the minor unknowns of order 1% will introduce errors of no more than 10% into each of the unknowns L, $\mu$, $\sigma$, and $\rho$. Together these parameters indicate the likely size of the target, and the physical parameters $\mu$, $\sigma$, and $\rho$ constrain the possibilities for the nature of the mineralisation in the target. Errors of 10% in any of them are insignificant at this stage of exploration.

By way of comparison, consider the situation in the case where the geophysical measurements are made by a number of different instruments on the same or different aircraft at different times, and without the ability to correct for altitude, topography, and attitude variations. There will be uncorrelated errors of between +/−40% and +/−80% in each of the magnetic, gravity, and radiometric measurements, and +/−80% in the EM measurements due to the errors in the altitude, topography and attitude. Then the equivalent proportionalities to those given above involve 2N more independent unknowns, representing the altitude, attitude and topography errors, that are of a magnitude comparable to the geophysical signals themselves, where N is the number of different flights used to assemble the data sets. This set of simultaneous equations is not soluble for the unknowns L, $\mu$, $\sigma$, and $\rho$. Independent estimates of some of these parameters can be made on the basis of assumed values for one or more of others of them, however the errors in the resulting estimates are then the combination of the residual errors in the data (40-80%) and those due to the assumptions made which may be hundreds of percent in error. Thus the estimates of L, $\mu$, $\sigma$, and $\rho$ will be usually in error by hundreds of percent.

In contrast, using the invention could result in a reduction of the errors in the parameters L, $\mu$, $\sigma$, and $\rho$ from hundreds of percent to the order of 10%.

The invention claimed is:

1. A method of making airborne geophysical measurements, comprising:
   taking first measurements as a function of time, from one or more geophysical instruments associated with or carried by at least one aircraft, to produce geophysical data related to the ground below respective geophysical instrument;
   taking second measurements as a function of time from navigation and mapping instruments associated with or carried by the at least one aircraft;
   computing a background response of each geophysical instrument as a function of time using the second measurements to take account of its time varying altitude, and a time varying topography of the ground below respective geophysical instrument;
   adjusting data processing conditions applied to the geophysical data from each geophysical instrument using the background response and an attitude of the respective geophysical instrument to enhance the performance of respective geophysical instrument; and,
   adjusting the geophysical data from each geophysical instrument using the background response of the respective geophysical instrument to yield a geophysical data output for respective geophysical instrument having reduced effects resulting from variations in altitude, attitude and topography.

2. A method of making airborne geophysical measurements according to claim 1, where the first and second measurements are taken in real time.

3. A method of making airborne geophysical measurements according to claim 1, where the first and second measurements are recorded on a recording medium.

4. A method of making airborne geophysical measurements according to claim 1, 2 or 3, where the geophysical data output from the respective geophysical instrument is used to identify exploration targets, and to compute their size and other key parameters, including density, electrical conductivity and magnetic properties.

5. A method of making airborne geophysical measurements according to claim 1, where the second measurements are used to compute any one or more of:
   (a) the trajectory of the at least one aircraft and of each of the one or more geophysical instruments in three dimensional space as a function of time;
   (b) an attitude (pitch, roll and yaw) of the one or more geophysical instruments as a function of time; and
   (c) a three-dimensional mathematical model of the ground below the at least one aircraft as a function of time, wherein the background response of each geophysical instrument is computed from the second measurements when the geophysical data is analyzed.

6. A method of making airborne geophysical measurements according to claim 1, where time varying adjustment or data processing conditions are calculated for each geophysical instrument from the background response of each geophysical instrument and each instrument's attitude.

7. A method of making airborne geophysical measurements according to claim 1, where the one or more geophysical instruments include a one or more magnetic surveying instrument, comprising a scalar magnetometer to measure the magnitude of a magnetic vector, a vector magnetometer to measure three orthogonal component of a magnetic vector, and a magnetic gradiometer measure six independent terms of a magnetic tensor.

8. A method of making airborne geophysical measurements according to claim 1, where the one or more geophysical instruments include an electromagnetic (EM) sounding system, to measure effects of electrical conductivities of rocks and minerals below the at least one aircraft.

9. A method of making airborne geophysical measurements according to claim 1, where the one or more geophysical instruments include a radiometric survey system to measure radioactive emanations from radioactive isotopes of elements that are constituent components of rocks and earth below the at least one aircraft.

10. A method of making airborne geophysical measurements according to claim 1, where the one or more geophysical instruments include a gravimeter sensor, to measure a magnitude of the earth's gravity.

11. A method of making airborne geophysical measurements according to claim 1, where the one or more geophysical instruments include a gravity gradiometer to measure a gradient of the earth's gravitational field.

12. A method of making airborne geophysical measurements according to claim 11, where the gravity gradiometer also yields the attitude of the at least one aircraft in three dimensional space, and a vertical velocity and an acceleration of the at least one aircraft.

13. A method of making airborne geophysical measurements according to claim 1, where the one or more geophysical instruments include a hyperspectral scanner to measure a reflectance of the earth, rocks and vegetation below the at least one aircraft.

14. A method of making airborne geophysical measurements according to claim 1, where the one or more geophysical instruments include a radar altimeter to determine an altitude.

15. A method of making airborne geophysical measurements according to claim 1, where the one or more geophysical instruments are mounted in the same or different aircraft, which is the same or a different aircraft from the one in which the navigation and mapping instruments are mounted.

16. A method of making airborne geophysical measurements according to claim 15, where the one or more geophysical instruments are mounted in different aircraft, and a first aircraft is towed behind a second aircraft, wherein the navigation and mapping instruments are mounted in the second aircraft.

17. A method of making airborne geophysical measurements according to claim 15, where the geophysical data from the respective geophysical instrument has been acquired by more than one geophysical instrument mounted in the same aircraft, and where the second measurements taken from each of the navigation and mapping instruments are used to identify and remove correlated errors in the first measurements, including residual height, topography, and attitude errors in magnetic, gravity, radiometrics, hyperspectral and electromagnetic instruments.

18. A method of making airborne geophysical measurements according to claim 1, where the navigation and mapping instruments includes a topographic measuring system, comprising a scanning system to emit pulses which reflect off the terrain below the at least one aircraft to measure the topography of the terrain to an accuracy of 1 meter over a distance of one to two times the at least one aircraft's height on either side of a track of the at least one aircraft.

19. A method of making airborne geophysical measurements according to claim 18, where the scanning system is a Synthetic Aperture Radar (SAR).

20. A method of making airborne geophysical measurements according to claim 18 or 19, where the navigation and mapping instruments includes an inertial navigation system, to determine the scanning system's position and orientation.

21. A method of making airborne geophysical measurements according to claim 18 or 19, where the navigation and mapping instruments includes a GPS or DGPS, to determine the position of the scanning system.

22. A method of making airborne geophysical measurements according to claim 1, where the navigation and mapping instruments includes a radar or other altimeter.

23. A method of making airborne geophysical measurements according to claim 1, where the navigation and mapping instruments includes a data logging system.

24. A method of making airborne geophysical measurements according to claim 20 where the navigation and mapping instruments include a GPS or a DGPS, to determine the position of the scanning system and, where the GPS and data from the inertial navigation system is processed together to derive a trajectory of the at least one aircraft and each of the one or more individual geophysical instruments as a function of time.

25. A method of making airborne geophysical measurements according to claim 24, where the trajectory is integrated with scanning ranges to provide a three-dimensional mathematical model of terrain surveyed by the at least one aircraft at all times.

26. A method of making airborne geophysical measurements according to claim 25, where the three-dimensional mathematical model is made up of a three-dimensional array of volume elements, the array may extend above and below the ground, and over a distance of up to twice the aircraft's height on either side of a point immediately below the at least one aircraft at a particular time, and each volume element makes at least an inverse square contribution to each instrument's reading.

27. A method of making airborne geophysical measurements according to claim 25, where the three-dimensional mathematical model is used to compute a magnetic, electrical, radiometric, gravity and hyperspectral background responses of each of the one or more geophysical instruments due to variations in the trajectory, and topography.

28. A method of making airborne geophysical measurements according to claim 1, where the background response from each geophysical instrument is computed instantaneously and the attitude for each of the one or more geophysical instruments is used to make continuous time varying adjustments to the data processing conditions being applied to the geophysical data from each geophysical instrument and to eliminate the background response from the geophysical data output for the respective geophysical instrument.

29. A method of making airborne geophysical measurements according to claim 1, where adjustments to the data processing conditions include using the background response from each geophysical instrument as a differential reference signal for the respective geophysical instrument, in order to significantly reduce a dynamic range of that respective geophysical instrument.

30. A method of making airborne geophysical measurements according to claim 1, where filter characteristics, or other processing parameters may be adjusted to obtain an optimum signal to noise ratio in the geophysical data output from the respective geophysical instrument output.

31. A method of making airborne geophysical measurements according to claim 26, where the three-dimensional mathematical model is used to compute magnetic, electrical, radiometric, gravity and hyperspectral background responses of each geophysical instrument due to variations in the trajectory, and topography.

* * * * *